(12) United States Patent
Nisley

(10) Patent No.: US 7,544,130 B2
(45) Date of Patent: Jun. 9, 2009

(54) FLEXIBLE SHAFT COUPLING SYSTEM WITH ANTIROTATIONAL FEATURES

(75) Inventor: Donald L. Nisley, Greenville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 359 days.

(21) Appl. No.: 11/520,176

(22) Filed: Sep. 13, 2006

(65) Prior Publication Data

US 2008/0064507 A1    Mar. 13, 2008

(51) Int. Cl.
F16D 3/58    (2006.01)
(52) U.S. Cl. .......................................... 464/80; 464/88
(58) Field of Classification Search ................ 464/80, 464/87, 88, 147
See application file for complete search history.

(56) References Cited

U.S. PATENT DOCUMENTS

| | | | | |
|---|---|---|---|---|
| 3,020,737 A | * | 2/1962 | Firth | 464/80 |
| 3,024,628 A | * | 3/1962 | Yang | 464/88 |
| 3,283,535 A | * | 11/1966 | Grundtner | 464/80 |
| 3,468,138 A | * | 9/1969 | Downey | 464/80 |
| 4,536,170 A | * | 8/1985 | Downey | 464/80 |
| 4,684,284 A | * | 8/1987 | Bradley, Jr. | |
| 5,910,049 A | * | 6/1999 | DeWachter et al. | 464/80 |
| 5,911,629 A | * | 6/1999 | Reynolds | 464/80 |

OTHER PUBLICATIONS

Rockwell Automation; Dodge couplings Para-Flex Couplings; www.dodge-pt.com/products/pt_components/couplings/paraflex_coupling.html; printed on Sep. 13, 2006; 2 pages.
Rockwell Automation; Dodge; Para-Flex GTL and GT Couplings; The Problem Solvers; brochure; 2006; 6 pages.

* cited by examiner

Primary Examiner—Greg Binda
Assistant Examiner—Clifford J Louden
(74) Attorney, Agent, or Firm—Thompson Coburn LLP; Matthew J. Himich

(57) ABSTRACT

A coupling system is disclosed for coupling rotating elements such as a pairs of shafts, flywheel and a shaft, and so forth. A first hub assembly is attached to a shaft via a tapered sleeve mechanism. A flexible element is captured by the hub assembly and is used to couple one rotating member to another. The hub assembly includes a hub, a flange, and an adjusting nut that are used in conjunction with fasteners to compress the flexible element. The flange has anti-rotation features that engage similar features on the outside diameter of the hub. The adjusting nut has internal threads that engage external threads on the hub outside diameter. The flexible element either mounts directly to the second rotating element or is captured by a second hub assembly. The second hub assembly is attached to the second shaft via a tapered sleeve mechanism.

15 Claims, 3 Drawing Sheets

FLEXIBLE SHAFT COUPLING SYSTEM WITH ANTIROTATIONAL FEATURES

BACKGROUND

The current invention relates to the field of mechanical couplings. More specifically, the invention relates to an improved flexible coupling system for coupling a shaft of one rotating member to a shaft or flywheel of another rotating member.

Mechanical systems often consist of a number of energy converting devices. A few examples of such devices include engines, motors, pumps, alternators, generators, and turbines. These devices are often physically connected to one another via a mechanical coupling to realize the potential of one energy source by converting it into a more useful form. For example, the rotating shaft of an internal combustion engine may drive a flywheel that is, in turn, coupled to the shaft of a pump or other driven device. The mechanical coupling serves to transfer the kinetic energy generated by the engine to drive the load, particularly by transmitting torque to the load during operation.

A variety of mechanical couplings are known and commercially available for connecting one rotating member to a second rotating member. All of these have limitations that impact the implementation and performance of the coupling when used in a mechanical system. One limitation is that existing couplings have a number of parts that have to be aligned in order to engage the coupling. The interaction and physical configuration of these parts often make them difficult to install and implement, as well as to service. Such difficulties lead to increased installation time and system downtime when servicing is required, particularly when the coupling is used in an application where direct access is limited. In this situation, the user has the difficult task of blindly aligning and engaging these coupling elements.

For example, some couplings require the alignment of a through hole in one element to a threaded hole in a second element in order to engage a fastener. The process of visually aligning these elements becomes tedious and time consuming when visual access to the coupling is limited. Furthermore, the installation task becomes even more difficult when alignment or interaction between more than two coupling elements is required. Thus, there is a need for a coupling that eliminates the alignment requirement between mating coupling elements.

Another limitation is that the couplings can be bulky and require more installation space than is available. In particular, the coupling might require excess installation room for engaging items such as the fasteners discussed above. This excess room is usually referred to as "dead space" and is only required for the initial assembly or disassembly process. Thus, there is a need for a coupling that reduces the required installation dead space.

Furthermore, the radial profile of mechanical couplings can also make installation and servicing difficult. The radial profile is typically driven by the alignment and mechanical interaction of multiple coupling elements as discussed above. For example, a fastener might be used to complete the coupling by loading a face on a first coupling element and engaging a thread in a second coupling element thereby securing the two parts together. The purpose of bringing these two elements together is often to capture a third coupling element therebetween. The mechanism described functions by placing the fastener in tension and requires that the fastener pass through or around the element being captured. Therefore, the coupling is often configured with the captured element and fastener located at different and non-concurrent radial distances from the centerline of the coupling. The end result is an increase in the radial profile to allow for the non-concurrence. Thus, there is a need for a coupling system that does not require the fastening element to pass through the clamped element. This would not only reduce the radial profile of the coupling, but would also allow the coupling to accept larger shaft diameters without requiring more radial space to accommodate the larger shaft diameter.

A further limitation results from the misalignment of the coupled shafts. This misalignment can be both axial (offset centerlines) and angular (non-perpendicular faces or misaligned axes of the driving and driven machines). Practically speaking, this misalignment can never be completely eliminated. Those skilled in the art will appreciate the advantages of a coupling device that could still function even when the shafts or other rotating elements are not in perfect alignment.

Some commercially available couplings address the misalignment issue by implementing a flexible element into the coupling, but often do so at the cost of reduced torque carrying capacity. This limitation may result from not applying the clamping force directly to the outer periphery of the element being captured, or from the forces being unevenly distributed across this periphery. The end result is that the torque carrying capacity of the coupling is reduced because the captured element may tend to peel out of the clamping mechanism. A coupling designed to apply a clamping force to the outer periphery of a captured element and/or evenly distribute forces across this periphery would have particular advantage over current designs.

Another issue arises as a result of dynamic imbalances inherent in any rotating device. At high rotational velocities these imbalances can result in severe lateral, torsional, and axial vibrations that are then transmitted through the system via the coupling. These vibrations cause the system to run less efficiently and can also damage vibration sensitive devices, such as bearings. A coupling that can dampen and isolate vibration, thereby preventing their transmission, would be of particular benefit.

Finally, most commercially available couplings make use of some type of threaded member for securing elements in place. The vibrations discussed above can cause these threaded members to be unthreaded. When this self-loosening occurs, the forces holding the coupling together are no longer present, potentially permitting the coupling to disengage. Thus, there is a need for a coupling that incorporates a positive locking feature to prevent threaded parts from self-loosing.

BRIEF DESCRIPTION

The present invention offers a coupling arrangement that addresses some or all of the issues and problems that currently limit other commercially available mechanical couplings. The invention generally consists of three parts, a first hub assembly, a second hub assembly, and a flexible element placed therebetween. Each hub assembly mounts to a shaft or other rotating member, and includes elements that are used to capture a periphery of the flexible element. The complaint nature of the flexible element allows for misalignment between the respective shafts as well as functioning as a dampener for shock and vibration isolation.

The innovative design of the current invention also eliminates the need to align multiple coupling elements in order to secure the coupling to the rotating members and to one another. This allows for the coupling to be easily installed and implemented into a mechanical system. The current invention also reduces the required assembly dead space, as well as minimizes the radial profile of the coupling system. These benefits were realized by configuring and arranging fasteners to compress the elements together. The resulting configuration minimizes the length of the fastener thereby reducing assembly dead space. The arrangement may also eliminate the need for the fastener to pass through the flexible element thereby reducing the radial profile of the coupling. Furthermore, this configuration may allow for the clamping force to be directly applied and evenly distributed to the outer periphery of the flexible element.

Finally, the current invention incorporates a positive locking feature to avoid the self-loosening that could result from shock and vibration. The fasteners used to clamp the flexible element can be configured to engage a recess in the rotatably fixed clamping element to prevent the adjusting nut from rotating or self-loosening.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
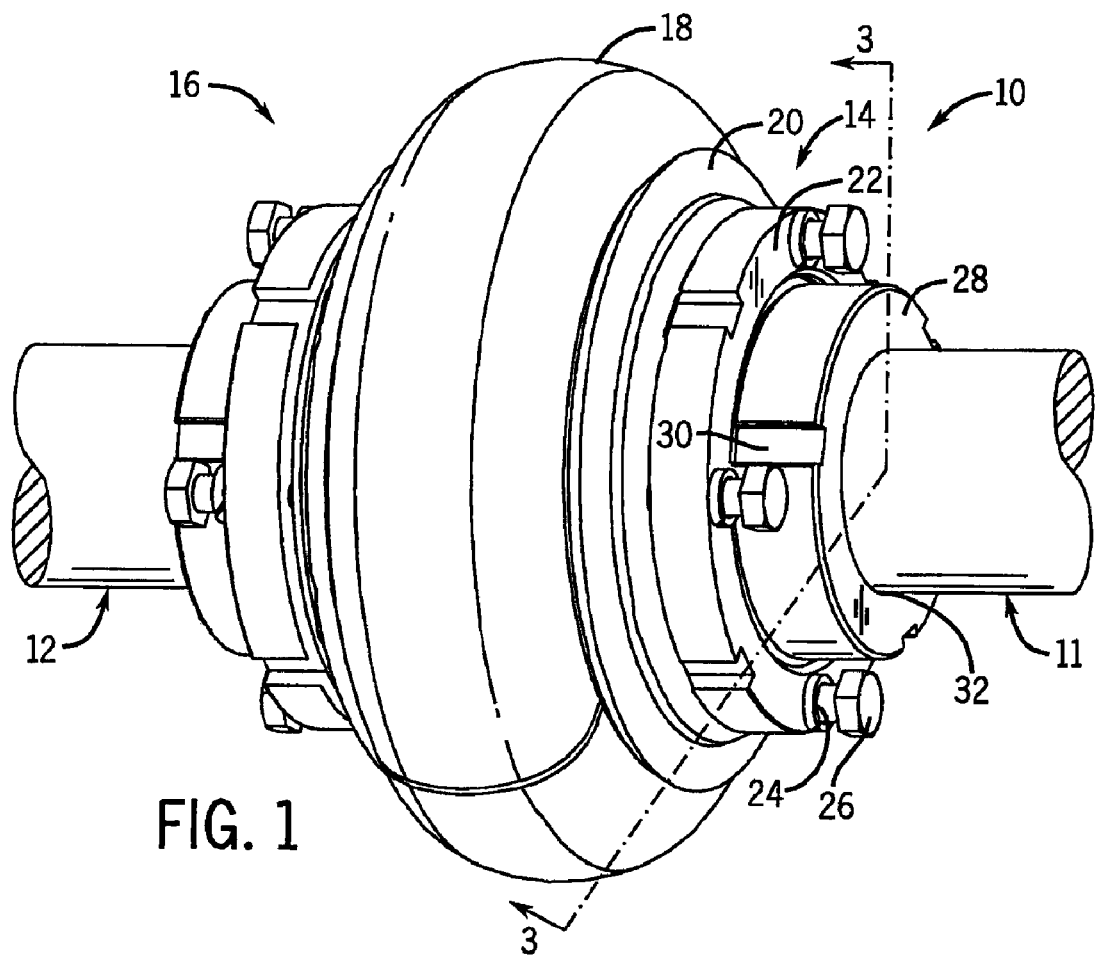
FIG. 1 is a perspective view of the flexible shaft coupling system illustrating a hub assembly mounted to a first shaft and a second hub assembly mounted to a second shaft with a flexible element placed therebetween.

Turning now to the drawings, FIG. 1 illustrates a first rotating shaft 10 coupled to a second rotating shaft 12 via a flexible shaft coupling system. The system comprises a first hub assembly 14 coupled to a second hub assembly 16 via a flexible element 18. The hub assemblies may be mirror images of one another, as in the illustrated embodiment, although this need not be the case, and different hubs may be used to accommodate differently sized shafts.

As shown for the hub on the right side of the system illustrated in FIG. 1, the flexible element 18 is coupled to the hub assembly via a flange 20 and adjusting nut 22. The flexible element is made from a compliant elastomeric material such as a reinforced natural rubber or neoprene. Those skilled in the art will readily appreciate that the invention is not functionally limited to these specific material choices and any suitable compliant material could be used for the flexible element. The compliant nature of the flexible element allows for the misalignment of the first rotating shaft 10 with respect to the second rotating shaft 12. This misalignment can be both axial (offset centerlines) and angular (non-perpendicular faces or misaligned axes of the driving and driven machines). Furthermore, the compliant nature of the flexible element serves to dampen and isolate shock and vibration between the shafts.

The adjusting nut 22 has a plurality of threaded holes 24 allowing for fasteners 26 to load the flange 20 and capture the flexible element 18. The mechanism for capturing the flexible element will be discussed in greater detail below. The hub assemblies 14 and 16 are coupled to the respective shafts via a tapered sleeve mechanism that will also be discussed in more detail below. FIG. 1 illustrates the locking nut 28 that is part of the tapered sleeve mechanism. The spanner slots 30 in the locking nut are use to engage the internal threads 32.

Figure 2:
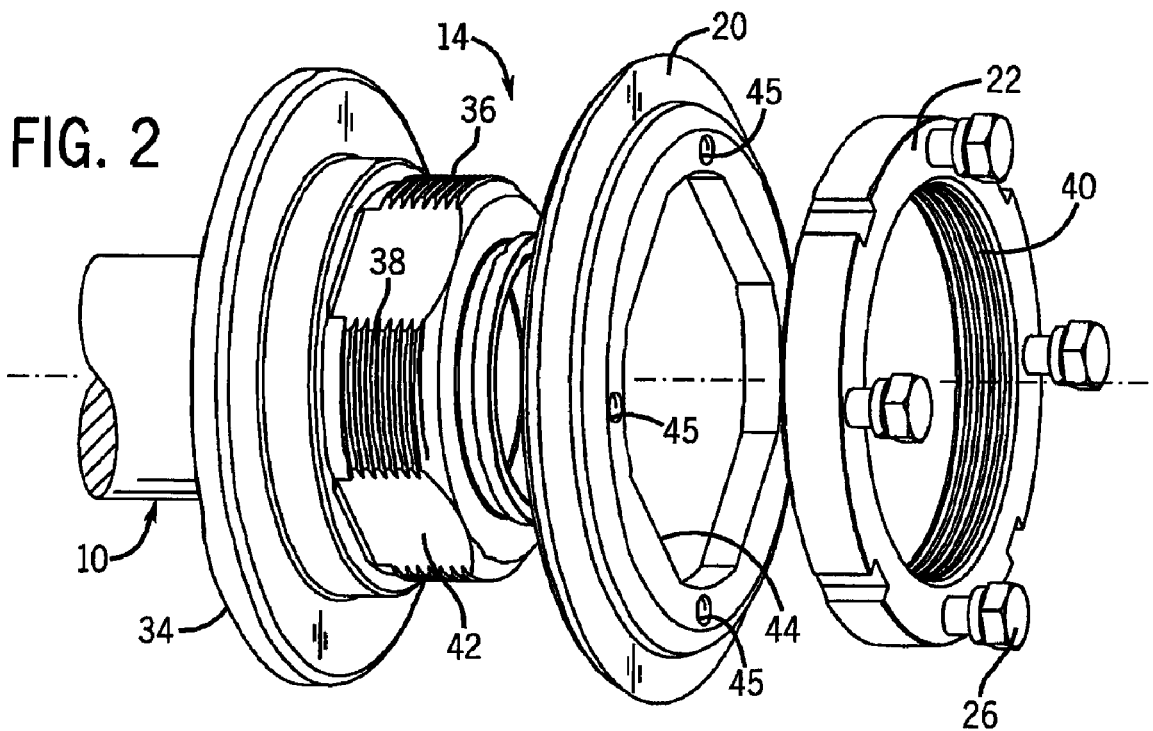
FIG. 2 is an exploded view of certain elements of the coupling system of FIG. 1, with the flexible element removed for clarity.

FIG. 2 is an exploded view illustrating certain elements for the first hub assembly 14. As discussed above, the second hub assembly 16 may be a mirror image of, or generally similar the first hub assembly and may include the same elements. The flexible element 18 and locking nut 28 have been removed for clarity (see FIG. 1). The figure illustrates the order in which the flange 20 and adjusting nut 22 are installed on the outside diameter 36 of the hub 34 to complete the assembly. The hub has an external thread 38 that is engaged by an internal thread 40 in the adjusting nut 22, thereby providing an axial load bearing feature. The interaction of these components allows the fasteners 26 to apply a compressive load to the flange that is used to capture the flexible coupling. Those skilled in the art will appreciate that the current invention is not limited to a screw thread for providing the axial load bearing feature. For example, the thread could be replaced with a snap ring or some other axial constraining element located on either the outside diameter of the hub, inside diameter of the adjusting nut, or a combination thereof.

The hub 34 has an anti-rotation feature that is engaged by the flange 20. The anti-rotation feature includes an external flat 42 on the hub that keys with an internal flat 44 in the flange, thereby preventing relative rotational movement between the hub and the flange. This also prevents the adjusting nut 22 from rotating or self-loosening when the fasteners 26 engage recesses 45 in the face of the flange 20. Those skilled in the art will appreciate that this anti-rotation feature is effective even if recesses 45 are not present, due to the resultant loading between the hub, fastener, flange, and adjusting nut. This force interaction will be described in greater detail below.

Figure 3:
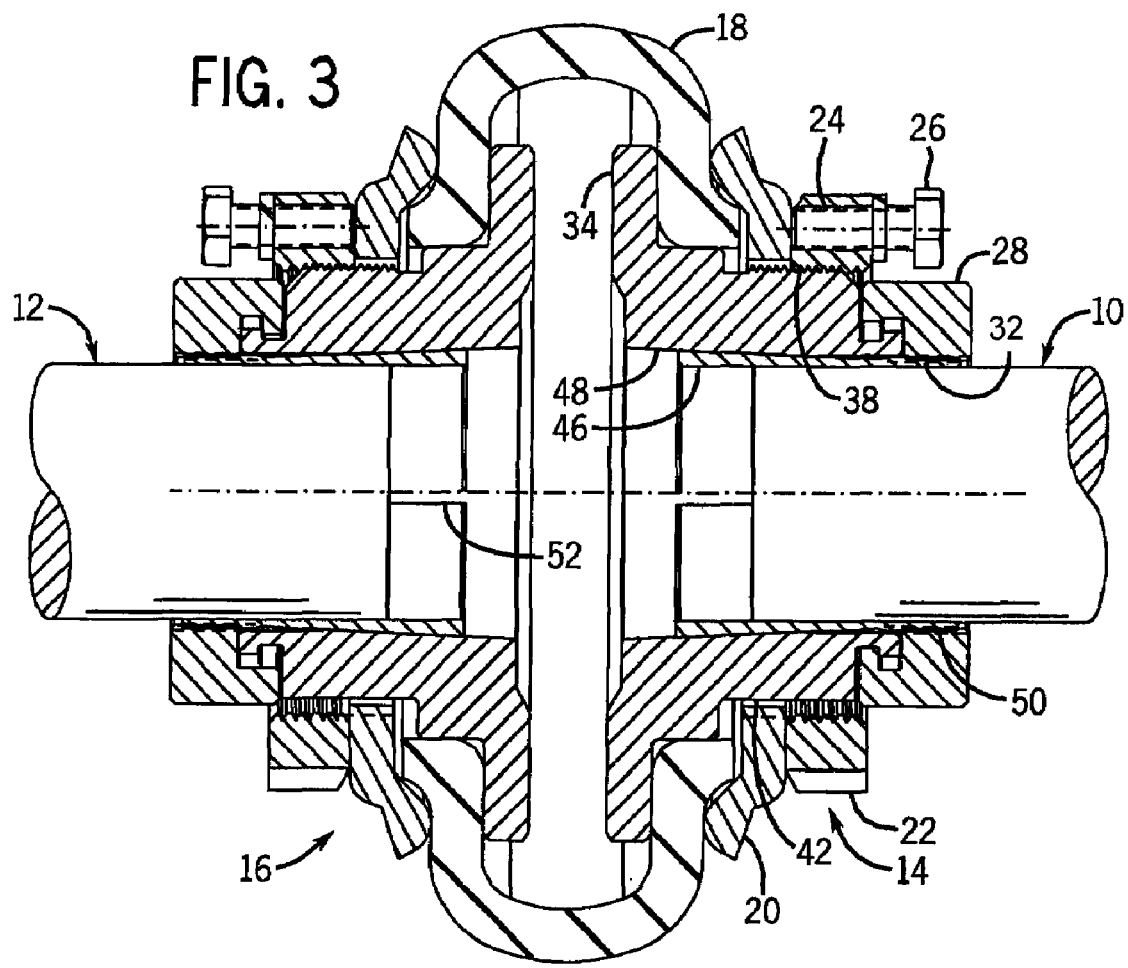
FIG. 3 is a sectional view of the flexible shaft coupling system of FIG. 1, sectioned along line 3-3, illustrating certain internal elements of the coupling system.

FIG. 3 is a cross sectional view of the flexible shaft coupling system of FIG. 1, sectioned along line 3-3. The figure illustrates the first hub assembly 14 attached to the first rotating member 10 and the second hub assembly 16 attached to the second rotation member 12 with the flexible element 18 positioned therebetween. Each assembly may be attached to the shaft via a tapered sleeve 46 having a tapered outside diameter mating with a tapered inside diameter 48 of the hub 34. Other mounting arrangements may be employed, and the tapered sleeves are but one example. The parts are driven together by engaging the internal thread 30 in the locking nut 28 to the external threads 50 on the tapered sleeve 46. The tapered sleeve 46 is axially split, as indicated by reference numeral 52, allowing it to clamp the shaft 10 when the two diameters are engaged. Those skilled in the art will appreciate that the split sleeve and interaction of the tapered surfaces locks the hub to the shaft.

Figure 4:
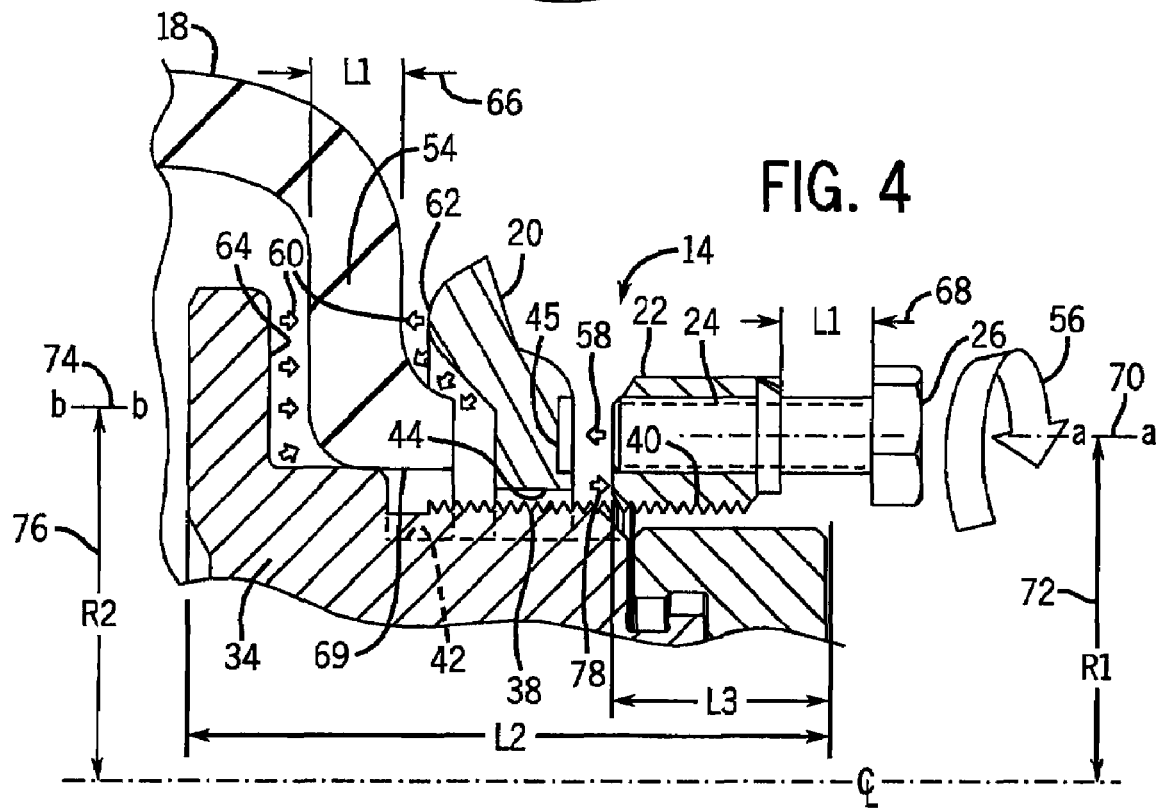
FIG. 4 is a detail view of the upper right portion of the coupling system of FIG. 3, illustrating interaction between the coupling elements.

FIG. 4 illustrates the interaction of the hub 34, flange 20, and adjusting nut 22 to capture a periphery of the flexible element 18. In this embodiment, the flexible element is tire-like having side walls. The first side wall forms a first periphery 54 that is captured by the first hub assembly 14. The periphery is captured by applying a torque, as indicated at reference numeral 56, to the fastener 26 resulting in an axial load 58 that urges the flange 20 towards the hub 34 thereby compressing the flexible element 18. A clamping force 60 is then created between the clamping face 62 of the flange 20 and the retaining face 64 of the hub 34. The faces are configured to allow for optimum distribution of the clamping force 60. Those skilled in the art will appreciate that the current invention is not limited to a plurality of fasteners 26 to apply the axial load 58 to the flange 20. For example, a spring or other mechanical element could be used instead to displace the flange and achieve similar functionality.

FIG. 4 further illustrates another advantage of threading the fastener 24 directly into the adjusting nut 22. This arrangement results in a reduction in the space required to implement the coupling. This is accomplished by reducing the overall length of the fastener, labeled "L3". The current configuration allows for this reduction because the amount of compression 66 on the flexible element is directly proportional to the travel distance 68 of the fastener 26, both labeled "L1" in the figure. This is a result of the fastener directly loading the flange via the compressive loading configuration. Those skilled in the art will appreciate that this reduces the initial required assembly space because the fastener is not required to engage a threaded hole in the hub 34 to create the clamping force 60. In this situation, the fastener would have to be significantly longer, represented by "L2", than the current fastener, represented by "L3", and would require more space to implement the coupling system.

FIG. 4 also illustrates how the current invention maximizes torque carrying capacity of the coupling system by minimizing the off-axis loading of the clamping forces 60 with respect to the applied axial load 58. The centerline 70, labeled "a-a", of the applied axial load 58 is located at a radial distance 72, labeled "R1", from the centerline of the shaft. This radial distance falls outside the inner edge 69 of the flexible element and illustrates that the application of the applied load is not constrained by the configuration of the flexible element 18. Thus, the centerline 70 of the applied load may be placed in line with the centerline 74, labeled "b-b", of the clamping force 60, which is located at a radial distance 76, labeled "R2", from the centerline of the shaft. The result is an evenly distributed load applied directly to the outer periphery of the flexible element resulting in a higher torque carrying capacity of the coupling. Those skilled in the art will appreciate that the current invention maximizes torque carrying capacity by minimizing off-axis loading and allowing for a direct application of the load to the outer periphery of the flexible element.

FIG. 4 further illustrates another advantage offered by the current invention. Those skilled in the art will appreciate that the fasteners 26 are only required to thread into the adjusting nut 22 to engage the clamping mechanism. Thus, the clamping mechanism is, for the most part, independent of the flexible element 18 and hub 34 configurations. Therefore, as discussed above, the current invention gas the ability to apply the centerline of the applied axial load at a location independent of the elements being clamped. In other words, the radial distance 72 to the centerline of the axial load can be varied depending on the application and desired clamping force profile. This allows for design flexibility in the configuration of the mating elements (i.e. hub, flange, and flexible element) with little impact on the functionality of the design. For example, the hub through bore can be increased or decreased to accept differently sized shafts without changing the load profile on the flexible element. Also, the configuration of the flexible element can be varied depending on the mechanical systems being coupled together. An example of an alternate embodiment demonstrating this advantage will be discussed below. Furthermore, this flexibility allows for a reduction in the radial profile of the coupling allowing it to operate in environments that are radially space-constrained. In addition, the current configuration has eliminated the need to align multiple coupling elements to install the coupling. The user only needs to thread the fastener 26 into the adjusting nut 22 to create the clamping force 60. This is significantly easier to implement than a coupling system where the user is required to align multiple coupling elements.

The current invention also incorporates a mechanism to prevent self-loosening or self-relieving of the threaded components. The external threads 38 not only support the clamping force 60, but also serve to prevent the adjusting nut 22 from self-loosening, thereby incorporating a positive locking feature. The locking feature is created by the resultant force 78 driving the threads 40 of the adjusting nut 22 into the threads 38 of the hub 34. The resultant force created by this interaction along with the force 58 created between the fastener 26 and flange 20 effectively force couple the adjusting nut 22 to the flange 20. The result is that the anti-rotation feature of the flange and hub (i.e. the external flats 42 and internal flats 44) is transferred to the adjusting nut. This anti-rotation feature will prevent the nut from rotating or self-loosening because the flange is rotatably constrained to the hub, thereby providing a positive locking feature for this threaded component.

The effectiveness of the positive locking feature can be increased by engaging the fastener into the recesses 45 located on the front face of the flange 20. In this configuration, not only would the resultant forces have to be overcome, but the fastener 26 would also have to be sheared before the adjusting nut 22 could rotate. Those skilled in the art will appreciate the advantages of a positive locking feature for a mechanical coupling that operates under severe shock and vibration since threaded elements may be prone to self-loosening or self-relieving under these conditions.

Figure 5:
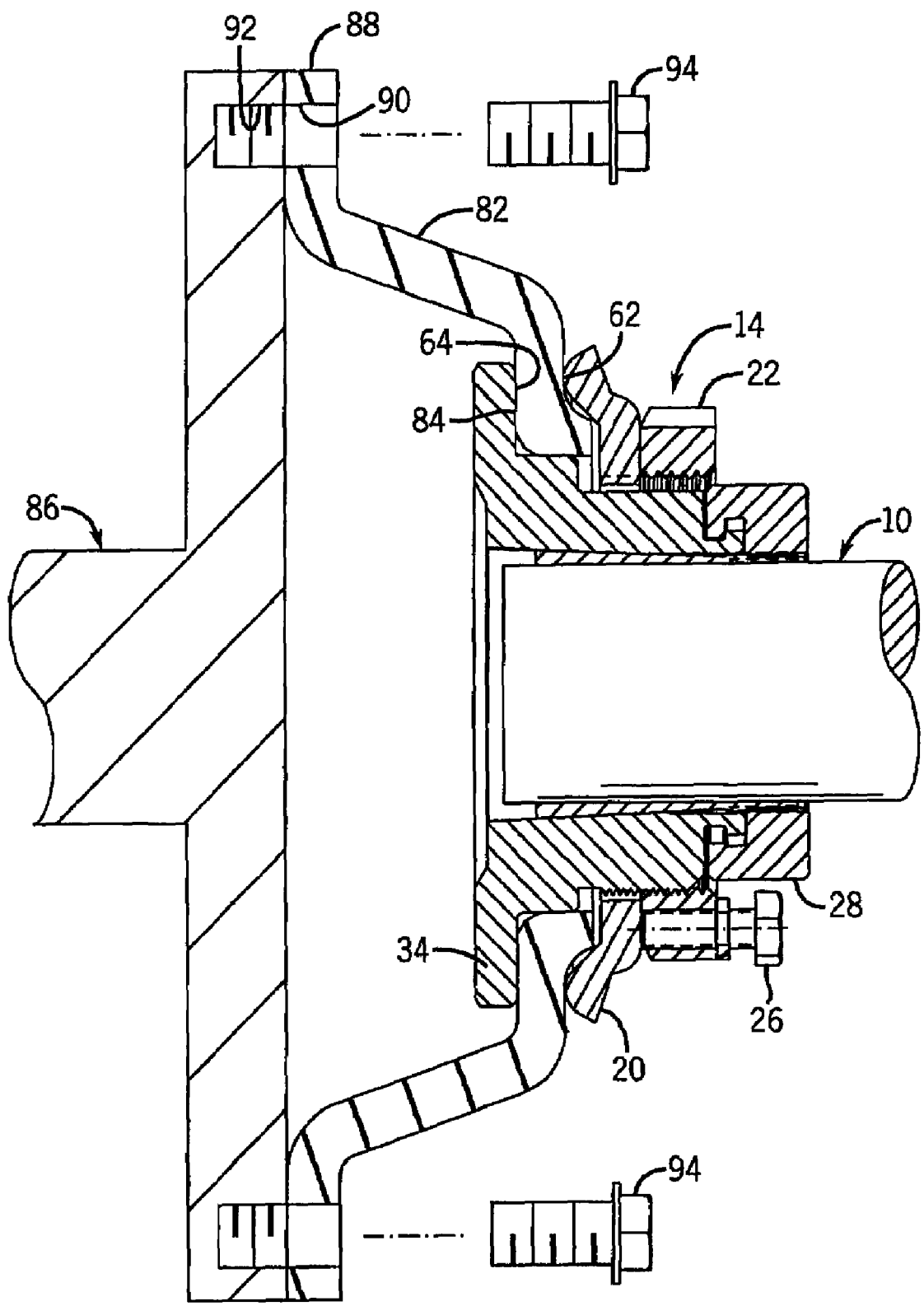
FIG. 5 is a sectional view illustrating a second alternate embodiment of the inventive coupling system.

As discussed above, the current invention allows for greater flexibility in the configuration of the coupling elements and more specifically in the configuration of the flexible element. FIG. 5 is sectional view of an alternate embodiment of the current invention where the tire-like flexible element 18 shown in FIG. 3 has been replaced by a disk-like flexible element 82. The element 82 is coupled to the hub assembly 14 in the same manner as in the previous embodiment. A periphery 84 of the flexible element 82 is captured between the clamping face 62 of the flange 20 and the retaining face 64 of the hub 34. Instead of coupling to a second shaft, the flexible element couples to a second rotating member such as a flywheel 86. To accommodate such coupling, the flexible element 82 has an outer flange 88 with holes 90 therethrough. The holes 90 align with threaded holes 92 in the flywheel 86. Fasteners 94 thus act as the securing element for this embodiment instead of the second hub assembly 16 shown in FIG. 3. In the illustrated arrangement, the first hub assembly 14 is coupled to the first rotating component via the tapered sleeve mechanism as previously discussed. This embodiment illustrates just one of the many configurations that can be implemented and demonstrates the flexibility of the current invention.

While only certain features of the invention have been illustrated and described herein, many modifications and changes will occur to those skilled in the art. It is, therefore, to be understood that the appended claims are intended to cover all such modifications and changes as fall within the true spirit of the invention.

I claim:

1. A mechanical coupling system for coupling a first rotating member to a second rotating member, comprising:
   a flexible element configured to transmit torque; and a first hub assembly configured to be secured to the first member, the hub assembly including:
  a hub having a retaining face and an outside diameter presenting an anti-rotation feature and screw threads wherein the anti-rotation feature includes an external flat located on the outside diameter of the hub;
  a flange having first and second axially opposite sides with an inner surface disposed therebetween, the flange inner surface having an internal flat configured to engage the hub outside diameter external flat to prevent relative rotational movement between the hub and the flange when the flange is assembled with the hub, the flange first side having an engagement surface extending substantially around the flange first side configured to engage the flexible element when the hub assembly is assembled with the flexible element; and
  an adjusting nut configured to engage the hub outside diameter screw threads and further configured to abut the flange second side and urge the flange first side engagement surface to capture a periphery of the flexible element between the retaining face and the flange.

2. The coupling system of claim 1, wherein the hub includes a series of flats separated by sections of screw threads, the flange engaging the series of flats and the nut engaging the sections of screw threads.

3. The coupling system of claim 2, wherein the flange is urged towards the periphery of the flexible member via a plurality of threads located in the nut.

4. The coupling system of claim 3, wherein the flange has a front face having at least one recess therein, the recess being engaged by at least one fastener to prevent the nut from rotating and disengaging the screw threads on the hub.

5. The coupling system of claim 4, wherein the flange and retaining face are configured to generally evenly distribute the load around the periphery of the flexible element.

6. The coupling system of claim 5, wherein the first hub assembly is secured to the first rotating member via a tapered sleeve and a locking nut.

7. The coupling system of claim 6, wherein the flexible element is tire-like having two side walls, the first side wall forming a first periphery and the second side wall forming a second periphery, the first periphery being captured by the first hub assembly.

8. The coupling system of claim 7, further comprising a second hub assembly configured to be secured to the second rotating member, the second hub assembly including a second hub having a second retaining face and a second outside diameter presenting an anti-rotation feature and screw threads, a second flange configured to engage the anti-rotation feature of the second hub, and a second adjusting nut configured to engage the screw threads and further configured to urge the second flange to capture the second periphery of the flexible element.

9. The coupling system of claim 8, wherein the first and second hubs are configured to receive differently sized first and second rotating members, respectively.

10. The coupling system of claim 6, wherein the flexible element is disk like having an inner periphery captured by the first hub assembly.

11. The coupling system of claim 10, further comprising a plurality of fasteners configured to couple the flexible element to the second rotating member.

12. A mechanical coupling system for coupling a first rotating member to a second rotating member, comprising:
  a flexible element having a periphery and an inner edge;
  a hub having an outside diameter and a retaining face, the hub being configured to be coupled to the first rotating member, the hub having an anti-rotation feature including an external flat located on the outside diameter of the hub;
  a flange having first and second axially opposite sides with an inner surface disposed therebetween, the flange inner surface having an internal flat configured to engage the hub outer diameter external flat to prevent relative rotational movement between the hub and the flange when the hub assembly is assembled with the flexible element, the flange first side having an engagement surface extending substantially around the flange first side configured to engage the flexible element when the hub assembly is assembled with the flexible element;
  an adjusting nut configured to engage an axial load bearing feature located on the outside diameter of the hub wherein the axial load bearing feature includes a screw thread located on the outside diameter of the hub; and
  a plurality of fasteners configured to engage the adjusting nut and urge the flange first side engagement surface towards the periphery of the flexible element thereby capturing the flexible element periphery between the retaining face and the flange.

13. The coupling system of claim 12, wherein the plurality of fasteners are subjected to a compressive load when the flange is seated against the flexible element thereby resulting in a compressive stress in the fasteners.

14. The coupling system of claim 13, wherein the fastener is located a radial distance from a center line of the coupling system that is greater than the radial distance from the center line of the coupling system to the inner edge of the flexible element when the fastener is engaged in the adjusting nut.

15. The coupling system of claim 14, wherein the flange has a front face having at least one recess located thereon, the recess being engaged by at least one fastener thereby preventing the adjusting nut from rotating and disengaging the screw threads on the hub.

* * * * *